United States Patent [19]
Satoh et al.

[11] Patent Number: 5,281,639
[45] Date of Patent: Jan. 25, 1994

[54] FLAME-RETARDANT THERMOPLASTIC RESIN COMPOSITION

[75] Inventors: Yuji Satoh; Katsuji Takahashi, both of Chiba, Japan

[73] Assignee: Dainippon Ink and Chemicals, Inc., Tokyo, Japan

[21] Appl. No.: 731,241

[22] Filed: Jul. 17, 1991

[30] Foreign Application Priority Data

Jul. 18, 1990 [JP] Japan .................. 2-187941

[51] Int. Cl.$^5$ .................. C08K 5/15; C08K 5/49; C08K 3/10

[52] U.S. Cl. .................. 524/114; 524/120; 524/128; 524/151; 524/158; 524/373; 524/374; 524/375; 524/405; 524/406; 524/411; 524/412; 524/430; 524/438

[58] Field of Search .............. 524/114, 373, 375, 128, 524/120, 153, 374, 411, 412, 430, 405, 406; 525/438

[56] References Cited

U.S. PATENT DOCUMENTS

| | | | |
|---|---|---|---|
| 3,965,212 | 6/1976 | Kamada et al. | 523/460 |
| 4,221,700 | 9/1980 | Minagawa et al. | 524/128 |
| 4,248,976 | 2/1981 | Clubley et al. | 524/114 |
| 4,258,153 | 3/1981 | Yomamoto et al. | 524/120 |
| 4,562,216 | 12/1985 | Kishida et al. | 524/375 |
| 4,879,329 | 11/1989 | Hongo et al. | 524/411 |
| 5,051,460 | 9/1991 | Kirsch et al. | 524/114 |
| 5,166,238 | 11/1992 | Nakano et al. | 524/120 |

FOREIGN PATENT DOCUMENTS

0124044  9/1979  Japan .
1126163  6/1986  Japan .
2015256  1/1987  Japan .

*Primary Examiner*—Paul R. Michl
*Assistant Examiner*—Tae H. Yoon
*Attorney, Agent, or Firm*—Armstrong, Westerman, Hattori, McLeland & Naughton

[57] ABSTRACT

A flame-retardant thermoplastic resin composition is disclosed, comprising (A) a thermoplastic resin, (B) a halogenated bisphenol type epoxy resin flame-retardant, and (C) an organic phosphite compound. The composition exhibits improved thermal stability to provide molded articles having improved mechanical strength and appearance.

9 Claims, No Drawings

FLAME-RETARDANT THERMOPLASTIC RESIN COMPOSITION

FIELD OF THE INVENTION

This invention relates to flame retardation of a thermoplastic resin and, more particularly to a flame-retardant thermoplastic resin composition having excellent thermal stability.

BACKGROUND OF THE INVENTION

Flame retardation of thermoplastic resins such as styrene resins and polyester resins have conventionally been carried out by compounding of flame-retardants, e.g., organic halogen compounds, and, if desired, flame-retardant assistants, e.g., antimony trioxide. Typical organic halogen compounds as flame-retardants include tetrabromobisphenol A (TBA) and decabromodiphenyl ether (DBDPE).

TBA, when compounded into thermoplastic resins, brings about great reductions in heat resistance and thermal stability and also a reduction in weatherability. DBDPE, when compounded into thermoplastic resins, causes a considerable reduction in weatherability. Besides, DBDPE has an extremely high melting point of about 307° C. and is therefore poor in dispersibility or compatibility in or with the resins, resulting in reductions in mechanical strength and appearance of molded articles. Further, these conventional flame-retardants are attended by corrosion of molds due to evolution of a halogen gas.

In order to settle down these problems, it has been proposed to compound a flame-retardant comprising a halogenated bisphenol A type epoxy resin into a thermoplastic resin as disclosed in JP-A-61-241343 and JP-A-62-4737 (the term "JP-A" as used herein means an "unexamined published Japanese patent application").

However, these flame-retardants turned to impair thermal stability of thermoplastic resins during molding. That is, the thermal history of the thermoplastic resin in the molten state during kneading in an extruder or molding in an injection molding machine induces decomposition chiefly of the flame-retardant itself, which tends to lead to not only deteriorated appearances of molded articles due to discoloration or generation of a burned mark, but also reductions in mechanical strength and thermal resistance of molded articles. Particularly serious reduction in thermal stability is observed with styrene resins and polyester resins which are molded at relatively high temperatures.

In an attempt to obtain a thermally stable flame-retardant thermoplastic resin composition, the inventors compounded the above-described flame-retardant resin composition with a known phenolic antioxidant as a heat stabilizer but only to provide a resin composition suffering from discoloration or burning, failing to accomplish the purpose.

A flame-retardant resin composition containing a brominated aliphatic hydrocarbon flame-retardant in combination with a specific organic phosphite compound is known as a flame-retardant composition having improved thermal stability as disclosed in JP-A-61-106641. However, because the flame-retardant used here has a low decomposition temperature, the effect of improving thermal stability is virtually lost when the resin composition is molded generally at temperatures exceeding 230° C.

SUMMARY OF THE INVENTION

Accordingly, an object of the present invention is to provide a thermoplastic resin composition having flame retardance while exhibiting excellent thermal stability.

The inventors have conducted further investigations in the light of the above-mentioned circumstances and, as a result, found that incorporation of an organic phosphite compound into a conventionally known flame-retardant thermoplastic resin composition comprising a thermoplastic resin and a halogenated bisphenol type epoxy resin flame-retardant produces an effect of improving thermal stability at molding temperatures even exceeding 230° C. and thus reached the present invention.

The present invention provides a flame-retardant thermoplastic resin composition comprising (A) a thermoplastic resin, (B) a halogenated bisphenol type epoxy resin flame-retardant, and (C) an organic phosphite compound.

DETAILED DESCRIPTION OF THE INVENTION

Thermoplastic resins (A) which can be used in the present invention include styrene resins, e.g., polystyrene, rubber-modified polystyrene (HIPS resins), styreneacrylonitrile copolymers (AS resins), acrylonitrile-butadienestyrene copolymers (ABS resins), acrylonitrile-acrylic rubberstyrene copolymers (AAS resins), and acrylonitrileethylene/propylene rubber-styrene copolymers (AES resins); polyester resins, e.g., polybutylene terephthalate and polyethylene terephthalate; polycarbonate resins; polyphenylene oxide resins; and polymer alloys (polymer blends), e.g., an alloy of an ABS resin and polycarbonate, an alloy of an ABS resin and polybutylene terephthalate, and an alloy of polystyrene and polyphenylene oxide. Preferred of them are styrene resins, polyester resins, and polymer alloys containing a styrene resin.

Halogenated bisphenol type epoxy resin flame-retardants (B) (hereinafter simply referred to flame-retardants (B)) which can be used in the present invention include halogenated bisphenol type epoxy resins (e.g., halogenated bisphenol A type epoxy resins, halogenated bisphenol F type epoxy resins, halogenated bisphenol S type epoxy resins, etc.) in which part or all of epoxy terminal groups are blocked. Of these, compounds represented by the following formula (I) are preferred:

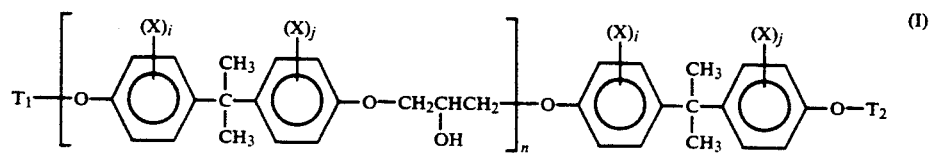

wherein $T_1$, $T_2$ each represent

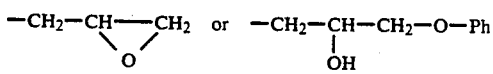

(wherein Ph represents a substituted or unsubstituted halogenated phenyl group); X represents a halogen atom; i and j each represents an integer of from 1 to 4; and n represents an average degree of polymerization ranging from 0 to 50.

Examples of Ph include

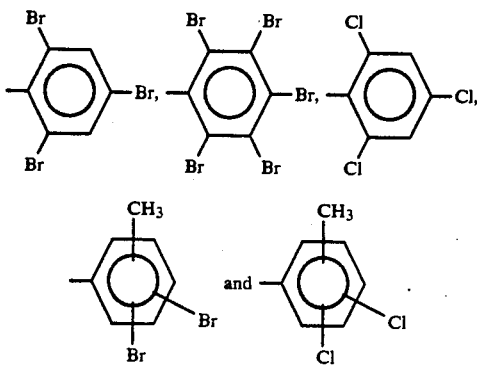

Flame-retardant (B) can be prepared through various processes, for example, a process comprising condensation between a halogenated bisphenol A and epichlorohydrin, a process comprising reaction between a diglycidyl ether of a halogenated bisphenol A and a halogenated bisphenol A, and a process comprising heat reaction between the above-mentioned halogenated bisphenol A type epoxy resin having an epoxy terminal group and a halogenated phenol, e.g., tribromophenol, pentabromophenol, trichlorophenol, dibromocresol, and dichlorocresol, in the presence of a basic catalyst.

In these processes, the reaction is preferably carried out at a temperature of from 100° C. to 230° C., and particularly from 140° C. to 200° C. Catalysts to be used in these processes include alkali metal hydroxides, e.g., sodium hydroxide; tertiary amines, e.g., dimethylbenzylamine; quaternary ammonium salts, e.g., tetramethylammonium chloride; phosphonium salts, e.g., ethyltriphenylphosphonium iodide; and phosphines, e.g., triphenylphosphine. Reaction solvents are not particularly needed and may or may not be used.

Specific examples of the halogenated bisphenol A are dibromobisphenol A, tetrabromobisphenol A, dichlorobisphenol A, and tetrachlorobisphenol A.

Commercially available flame-retardants (B) include PRATHERM, EP-16, EP-100, EP-500, EC-14, EC-20, and EC-30, all produced by Dainippon Ink & Chemicals, Inc.

Flame-retardant (B) is usually used in an amount of from 3 to 40 parts by weight per 100 parts by weight of the thermoplastic resin. For obtaining a particularly enhanced flame-retardant effect while avoiding reductions in physical properties such as impact resistance, it is preferably used in an amount of from 5 to 30 parts by weight.

Organic phosphite compound (C) which is used in the present invention acts as a stabilizer on flame-retardant (B) and is essential for exerting thermal stability improving effects. Any of organic phosphite compounds commercially available as compounding additives for resins is usable.

Typical examples of organic phosphite compound (C) include triphenyl phosphite, diphenylisodecyl phosphite, tris(dinonylphenyl) phosphite, 2,2-methylenebis(4,6-di-t-butylphenyl)octyl phosphite, tris(2,4-di-t-butylphenyl)phosphite, diisodecylpentaerythritol diphosphite, bis(2,4-di-t-butylphenyl)pentaerythritol diphosphite, and bis(2,6-di-t-butyl-4-methylphenyl)pentaerythritoldiphosphite. For obtaining markedly improved thermal stability, particularly preferred of them are pentaerythritol diphosphite compounds having a phenyl group carrying two or more substituents, e.g., bis(2,4-di-t-butylphenyl)pentaerythritol diphosphite and bis(2,6-di-t-butyl-4-methylphenyl)pentaerythritoldiphosphite.

Organic phosphite compound (C) is usually used in an amount of from 0.01 to 5 parts by weight per 100 parts by weight of the thermoplastic resin. From the standpoint of obtaining enhanced thermal stability while avoiding reductions in heat resistance and mechanical strength, it is preferably used in an amount of from 0.05 to 3 parts.

If desired, the thermoplastic resin composition according to the present invention may contain flame-retardant assistants to further increase the flame-retardant effects. Examples of suitable flame-retardant assistants include antimony compounds, e.g., antimony trioxide, antimony tetroxide and antimony pentoxide; tin compounds, e.g., tin oxide and tin hydroxide; molybdenum compounds, e.g., molybdenum oxide and ammonium molybdenum; zirconium compounds, e.g., zirconium oxide and zirconium hydroxide; and boron compounds, e.g., zinc borate and barium metaborate.

The flame-retardant assistant is usually added in an amount of from 1 to 10 parts by weight per 100 parts by weight of the thermoplastic resin. For obtaining enhanced flame-retardant effects while minimizing reduction of impact resistance, it is preferably added in an amount of from 3 to 7 parts.

The resin composition according to the present invention can easily be prepared by pre-mixing predetermined amounts of thermoplastic resin (A), flame-retardant (B), organic phosphite compound (C) and, if desired, a flame-retardant assistant in a mixing machine, e.g., a Henschel mixer, a tumble mixer, etc., and melt-kneading the mixture in an extruder, a kneader, a heat roll, a Banbury mixer, etc.

The thus prepared flame-retardant thermoplastic resin composition has excellent thermal stability and produces molded articles which suffer from no defect, such as discoloration and generation of a burned mark. Accordingly, it makes great contribution to an increase of molding productivity. Further, it can be molded into articles having a large size or a complicated shape which require high molding temperatures and is therefore useful as molding materials for electric or electronic equipment and automobile parts demanded to have flame retardance.

If desired, the resin composition may further contain other known flame-retardants as far as the thermal stability during molding is not considerably impaired. The composition may furthermore contain compounding additives, such as ultraviolet absorbents, light stabilizers, release agents, lubricants, colorants, plasticizers, fillers, heat stabilizers, antioxidants, foaming agents, and reinforcing agents (e.g., glass fiber, carbon fiber, aramid fiber).

The present invention is now illustrated in greater detail with reference to Synthesis Examples and Examples in view of Comparative Examples, but it should be understood that the present invention is not deemed to be limited thereto. All the percents and parts are by weight unless otherwise indicated.

In Examples, thermal stability of resin compositions prepared and combustibility flammability) of molded products obtained from the resin compositions were evaluated according to the following test methods.

1) Burninq Test (UL-94 Standard)

Burning resistance was tested on five specimens of 5 in long, ½ in wide and ⅛ in thick per sample in accordance with the method of Subject No. 94 of Underwriters, Laboratories Inc., (UL-94).

2) Thermal Stability 2-a) To Retention in Molding Machine

A resin composition was charged in a 5 Oz injection molding machine and molded after a retention time of 10 mins, 20 mins, or 40 mins at a cylinder temperature of 230° C. Discoloration and burning of the resulting molded article were visually observed and evaluated according to the following rating system.

A ... Excellent (No discoloration)
B ... Good (Slight yellowing)
C ... Medium (Slight burning with color change to brown)
D ... Bad (Burning and serious discoloration with a large amount of burned mark)

2-b) To Molding Temperature

A resin composition was molded by means of a 5 Oz injection molding machine at a cylinder temperature of 230° C., 250° C., or 270° C. Discoloration and burning of the resulting molded article were visually observed and evaluated according to the same rating system as in (2-a) above. 2-c) Corrosiveness on Metal A resin composition was molded by means of a 5 Oz injection molding machine at a cylinder temperature of 230° C. to obtain a 40 mm long, 30 mm wide and 3 mm thick plate. The resin plate was placed on a 300 mm long, 300 mm wide and 15 mm thick metallic plate of the same material as a mold (S55C) which had been subjected to degreasing, and the resin plate on the metallic plate was held in an oven at 180° C. for 24 hours. After the holding, the resin plate was removed, and the metallic plate was allowed to cool to room temperature over 6 hours. Any change of the surface of the metallic plate where the resin plate had been placed was visually observed and evaluated according to the following rating system.

A ... Good (Slight discoloration)
B ... Medium (Discoloration with no rust)
C ... Bad (Serious discoloration and rust)

SYNTHESIS EXAMPLE 1

In a 1l separable flask equipped with a stirrer were charged 720.0 g of tetrabromobisphenol A diglycidyl ether ("EPICLON 152" produced by Dainippon Ink & Chemicals, Inc.; epoxy equivalent: 360; bromine content: 48%; compound of formula (I) wherein n is 0.1) and 223.2 g of tetrabromobisphenol A. After the inner atmosphere was displaced with nitrogen, the mixture was heat-melted and, after addition of 0.5 g of a 10% sodium hydroxide aqueous solution at 100° C., allowed to react at 150° C. for 5 hours. After the reaction, the reaction mixture was spread in a stainless steel pan, cooled, and ground to obtain a pale yellow powder of a flame-retardant (designated flame-retardant (B-1). Flame-retardant (B-1) was the compound of formula (I) wherein n is 1.6 having an epoxy equivalent of 810, a softening point of 116° C., and a bromine content of 50%.

SYNTHESIS EXAMPLE 2

In a 1l separable flask equipped with a stirrer were charged 720.0 g of EPICLON 152 and 472.0 g of tetrabromobisphenol A. After the inner atmosphere was displaced with nitrogen, the mixture was heat-melted. To the molten mixture was added 0.6 g of a 10% sodium hydroxide aqueous solution at 100° C., followed by stirring at 140° C. for 2 hours. The reaction was further continued at 180° C. for 10 hours. After the reaction, the reaction mixture was cooled and ground to obtain a pale yellow powder of a flame-retardant (designated flame-retardant (B-2)). Flame-retardant (B-2) was the compound of formula (I) wherein n is 15 having an epoxy equivalent of 4800, a softening point of 183° C., and a bromine content of 52%.

SYNTHESIS EXAMPLE 3

Flame-retardant (B-3) was prepared in the same manner as in Synthesis Example 2, except for using 720.0 g of EPICLON 152, 533.0 g of tetrabromobisphenol A, and 1.3 g of a 10% sodium hydroxide aqueous solution. Flame-retardant (B-3) was the compound of formula (I) wherein n is 42 having an epoxy equivalent of 13100, a softening point of 210° C., and a bromine content of 52%.

SYNTHESIS EXAMPLE 4

In a 1l separable flask equipped with a stirrer were charged 720.0 g of EPICLON 152 and 622.0 g of 2,4,6-tribromophenol. After the inner atmosphere was displaced with nitrogen, the mixture was heat-melted. After addition of 1.3 g of a 10% sodium hydroxide aqueous solution at 100° C., the mixture was allowed to react at 150° to 180° C. for 8 hours. After the reaction, the reaction mixture was spread in a stainless steel pan, cooled, and ground to obtain a pale yellow powder of a terminal-sealed type epoxy resin flame-retardant (designated flame-retardant (B-4)). Flame-retardant (B-4) was the compound of formula (I) wherein n is 0.1 having a softening point of 100° C. and a bromine content of 59%.

SYNTHESIS EXAMPLE 5

A terminal-sealed type epoxy resin flame-retardant (B-5) was prepared in the same manner as in Synthesis Example 4, except for using 720.0 g of EPICLON 152, 245.0 g of 2,4,6-tribromophenol, 306.0 g of tetrabromobisphenol A, and 1.3 g of a 10% sodium hydroxide aqueous solution. Flame-retardant (B-5) was the compound of formula (I) wherein n is 3 having a softening point of 140° C. and a bromine content of 55%.

EXAMPLES 1 TO 13 AND COMPARATIVE EXAMPLES 1 TO 15

Components shown in Table 1 below were compounded at a ratio shown and premixed in a tumble mixer and then pelletized in a twin-screw extruder (diameter: 30 mm) at a cylinder temperature of 230° C. The pellets were injection molded in a 5 Oz injection molding machine at a cylinder temperature of 230° C. and at a mold temperature of 60° C. to prepare species.

Test for flammability was conducted on the resulting species. Further, tests for thermal stability were conducted using a 5 Oz injection molding machine. The results obtained are shown in Table 2 below.

TABLE 1

| | Example No. | | | | | | | | | | | | |
|---|---|---|---|---|---|---|---|---|---|---|---|---|---|
| | 1 | 2 | 3 | 4 | 5 | 6 | 7 | 8 | 9 | 10 | 11 | 12 | 13 |
| Composition (part): | | | | | | | | | | | | | |
| ABS resin*1 | 100 | 100 | 100 | 100 | 100 | — | — | — | 100 | 100 | — | 100 | 100 |
| HIPS resin*2 | — | — | — | — | — | 100 | 100 | — | — | — | — | — | — |
| PBT resin*3 | — | — | — | — | — | — | — | 100 | — | — | 100 | — | — |
| Flame-retardant | (B-1) | (B-2) | (B-3) | (B-4) | (B-5) | (B-1) | (B-4) | (B-2) | (B-1) | (B-1) | (B-1) | (B-1) | (B-1) |
| | 27 | 25 | 25 | 23 | 24 | 20 | 20 | 20 | 27 | 27 | 20 | 27 | 27 |
| Decabromodiphenyl ether | — | — | — | — | — | — | — | — | — | — | — | — | — |
| Tetrabromo-bisphenol A | — | — | — | — | — | — | — | — | — | — | — | — | — |
| Tetrabromo-bisphenol S | — | — | — | — | — | — | — | — | — | — | — | — | — |
| Dibromoneopentyl glycol | — | — | — | — | — | — | — | — | — | — | — | — | — |
| Antimony trioxide | 7 | 7 | 7 | 7 | 7 | 5 | 5 | 7 | 7 | 7 | 5 | 7 | 7 |
| Organic phosphite compound: | | | | | | | | | | | | | |
| (I)*4) | 0.4 | 0.4 | 0.4 | 0.4 | 0.4 | 0.4 | 0.4 | 0.4 | 0.2 | — | — | — | — |
| (II)*5) | — | — | — | — | — | — | — | — | — | 0.4 | — | — | — |
| (III)*6) | — | — | — | — | — | — | — | — | — | — | 0.4 | — | — |
| (IV)*7) | — | — | — | — | — | — | — | — | — | — | — | 0.4 | — |
| (V)*8) | — | — | — | — | — | — | — | — | — | — | — | — | 0.4 |
| Phenolic antioxidant*9) | — | — | — | — | — | — | — | — | — | — | — | — | — |

| | Comparative Example No. | | | | | | | | | | | | | | |
|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 |
| Composition (part): | | | | | | | | | | | | | | | |
| ABS resin*1 | 100 | 100 | 100 | 100 | 100 | 100 | 100 | 100 | 100 | 100 | 100 | — | 100 | 100 | 100 |
| HIPS resin*2 | — | — | — | — | — | — | — | — | — | — | — | — | — | — | — |
| PBT resin*3 | — | — | — | — | — | — | — | — | — | — | — | 100 | — | — | — |
| Flame-retardant | (B-1) | (B-2) | (B-4) | (B-5) | (B-1) | (B-4) | (B-4) | — | — | — | — | (B-2) | — | — | — |
| | 27 | 25 | 25 | 23 | 24 | 27 | 23 | | | | | 20 | | | |
| Decabromodiphenyl ether | — | — | — | — | — | — | — | 17 | — | 17 | — | — | — | — | — |
| Tetrabromo-bisphenol A | — | — | — | — | — | — | — | — | 25 | — | 25 | — | — | — | — |
| Tetrabromo-bisphenol S | — | — | — | — | — | — | — | — | — | — | — | — | 25 | 25 | — |
| Dibromoneopentyl glycol | — | — | — | — | — | — | — | — | — | — | — | — | — | — | 23 |
| Antimony trioxide | 7 | 7 | 7 | 7 | 7 | 7 | 7 | 7 | 7 | 7 | 7 | 7 | 7 | 7 | 7 |
| Organic phosphite compound: | | | | | | | | | | | | | | | |
| (I)*4) | — | — | — | — | — | — | — | — | — | 0.4 | 0.4 | — | 0.4 | — | — |
| (II)*5) | — | — | — | — | — | — | — | — | — | — | — | — | — | — | — |
| (III)*6) | — | — | — | — | — | — | — | — | — | — | — | — | — | — | — |
| (IV)*7) | — | — | — | — | — | — | — | — | — | — | — | — | — | — | — |
| (V)*8) | — | — | — | — | — | — | — | — | — | — | — | — | — | 0.4 | — |
| Phenolic antioxidant*9) | — | — | — | — | — | 0.4 | 0.4 | — | — | — | — | — | — | — | 0.4 |

| | Example No. | | | | | | | | | | | | |
|---|---|---|---|---|---|---|---|---|---|---|---|---|---|
| | 1 | 2 | 3 | 4 | 5 | 6 | 7 | 8 | 9 | 10 | 11 | 12 | 13 |
| Flammability (UL-94 Standard) | V-0 | V-0 | V-0 | V-0 | V-0 | V-0 | V-0 | V-0 | V-0 | V-0 | V-0 | V-0 | V-0 |
| Thermal stability: | | | | | | | | | | | | | |
| (a) Retention Time: | | | | | | | | | | | | | |
| 10 min | A | A | A | A | A | A | A | A | A | A | A | A | A |
| 20 min | A | A | A | A | A | A | A | A | A | A | A | B | B |
| 40 min | B | B | B | B | B | B | B | B | B | B | B | B-C | C |
| (b) Molding Temp.: | | | | | | | | | | | | | |
| 230° C. | A | A | A | A | A | A | A | A | A | A | A | A | A |
| 250° C. | A | A | A | A | A | A | A | A | A | A | A | B | B |
| 270° C. | B | B | B | B | B | B | B | B | B | B | B | B-C | B |
| (c) Non-corrosiveness on metal | A | A | A | A | A | A | A | A | A | A | A | A | A |

| | Comparative Example No. | | | | | | | | | | | | | | |
|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 |

-continued

| Flammability (UL-94 Standard) | V-0 | V-0 | V-0 | V-0 | V-0 | V-0 | V-0 | V-0 | V-0 | V-0 | V-0 | V-0 | V-0 | V-0 | V-2 |
|---|---|---|---|---|---|---|---|---|---|---|---|---|---|---|---|
| Thermal stability: | | | | | | | | | | | | | | | |
| (a) Retention Time: | | | | | | | | | | | | | | | |
| 10 min | C | B | B | C | B | C | C | B | C | B | C | B | C | C-D | D |
| 20 min | D | C | C | C | C | D | C | C | D | C | D | C | D | D | D |
| 40 min | D | D | D | D | D | D | D | D | D | D | D | D | D | D | D |
| (b) Molding Temp.: | | | | | | | | | | | | | | | |
| 230° C. | C | B | B | B | B | C | B | B | C | B | C | B | C | C-D | D |
| 250° C. | D | C | C | C | C | C | C | C | D | C | D | C | D | D | D |
| 270° C. | D | D | D | D | D | D | D | D | D | D | D | D | D | D | D |
| (c) Non-corrosiveness on metal | B | B | B | B | B | B | B | C | C | C | C | B | C | C | C |

Note:
*¹⁾ABS resin: Acrylonitrile-styrene-butadiene copolymer "CEVIAN V" Grade 300, produced by Daisel Ltd.
*²⁾HIPS resin: Rubber-modified polystyrene "DICSTYRENE GH-7000" produced by Dainippon Ink & Chemicals, Inc.
*³⁾PBT resin: Polybutylene terephthalate "VALOX" produced by Nippon GE Plastic K.K.
*⁴⁾Organic phosphite compound (I): Bis(2,6-di-t-butyl-4-methylphenyl)pentaerythritol diphosphite
*⁵⁾Organic phosphite compound (II): 2,2-Methylenebis(4,6-di-t-butylphenyl)octyl phosphite
*⁶⁾Organic phosphite compound (III): Tris(2,4-di-t-butylphenyl) phosphite
*⁷⁾Organic phosphite compound (IV): Bis(4-nonylphenyl)pentaerythritol diphosphite
*⁸⁾Organic phosphite compound (V): Dibutylpentaerythritol diphosphite
*⁹⁾Phenolic antioxidant: Tetrakis[methylene(3,5-di-t-butyl-4-hydroxyhydrocinnamate)]methane While the invention has been described in detail and with reference to specific examples thereof, it will be apparent to one skilled in the art that various changes and modifications can be made therein without departing from the spirit and scope thereof.

We claim:

1. A flame-retardant thermoplastic resin composition comprising a thermoplastic resin (A) selected from the group consisting of a styrene resin and a polymer alloy containing a styrene resin, (B) a halogenated bisphenol epoxy resin flame-retardant, and (C) an organic phosphite compound.

2. A flame-retardant thermoplastic resin composition as claimed in claim 1, wherein said organic phosphite compound (C) is one or more compounds selected from the group consisting of triphenyl phosphite, diphenylisodecyl phosphite, tris(dinonylphenyl) phosphite, 2,2-methylenebis(4,6-di-t-butylphenyl)octyl phosphite, tris(2,4-di-t-butylphenyl) phosphite,diisodecylpentaerythritoldiphosphite,bis(2,4-di-t-butylphenyl)-pentaerythritol diphosphite, and bis(2,6-di-t-butyl-4-methylphenyl)pentaerythritol diphosphite.

3. A flame-retardant thermoplastic resin composition as claimed in claim 1, wherein said organic phosphite compound (C) is a pentaerythritol diphosphite compound having a phenyl group carrying at least two substituents.

4. A flame-retardant thermoplastic resin composition as claimed in claim 3, wherein said organic phosphite compound (C) is bis(2,4-di-t-butylphenyl)pentaerythritol diphosphite or bis(2,6-di-t-butyl-4-methylphenyl)pentaerythritoldiphosphite.

5. A flame-retardant thermoplastic resin composition as claimed in claim 1, wherein said thermoplastic resin (A) contains a polyester resin.

6. A flame-retardant thermoplastic resin composition as claimed in claim 1, wherein said organic phosphite compound (C) is present in an amount of from 0.05 to 3 parts by weight per 100 parts by weight of the thermoplastic resin (A).

7. A flame-retardant thermoplastic resin composition as claimed in claim 1, wherein said halogenated bisphenol epoxy resin flame-retardant (B) is present in an amount of from 5 to 30 parts by weight per 100 parts by weight of the thermoplastic resin (A).

8. A flame-retardant thermoplastic resin composition as claimed in claim 1, wherein said composition further contains a flame-retardant assistant.

9. A flame-retardant thermoplastic resin composition as claimed in claim 8, wherein said flame-retardant assistant is selected from the group consisting of antimony trioxide, antimony tetroxide, antimony pentoxide, tin oxide, tin hydroxide, molybdenum oxide, ammonium molybdenum, zirconium oxide, zirconium hydroxide, zinc borate and barium metaborate.

* * * * *